Figure 1:
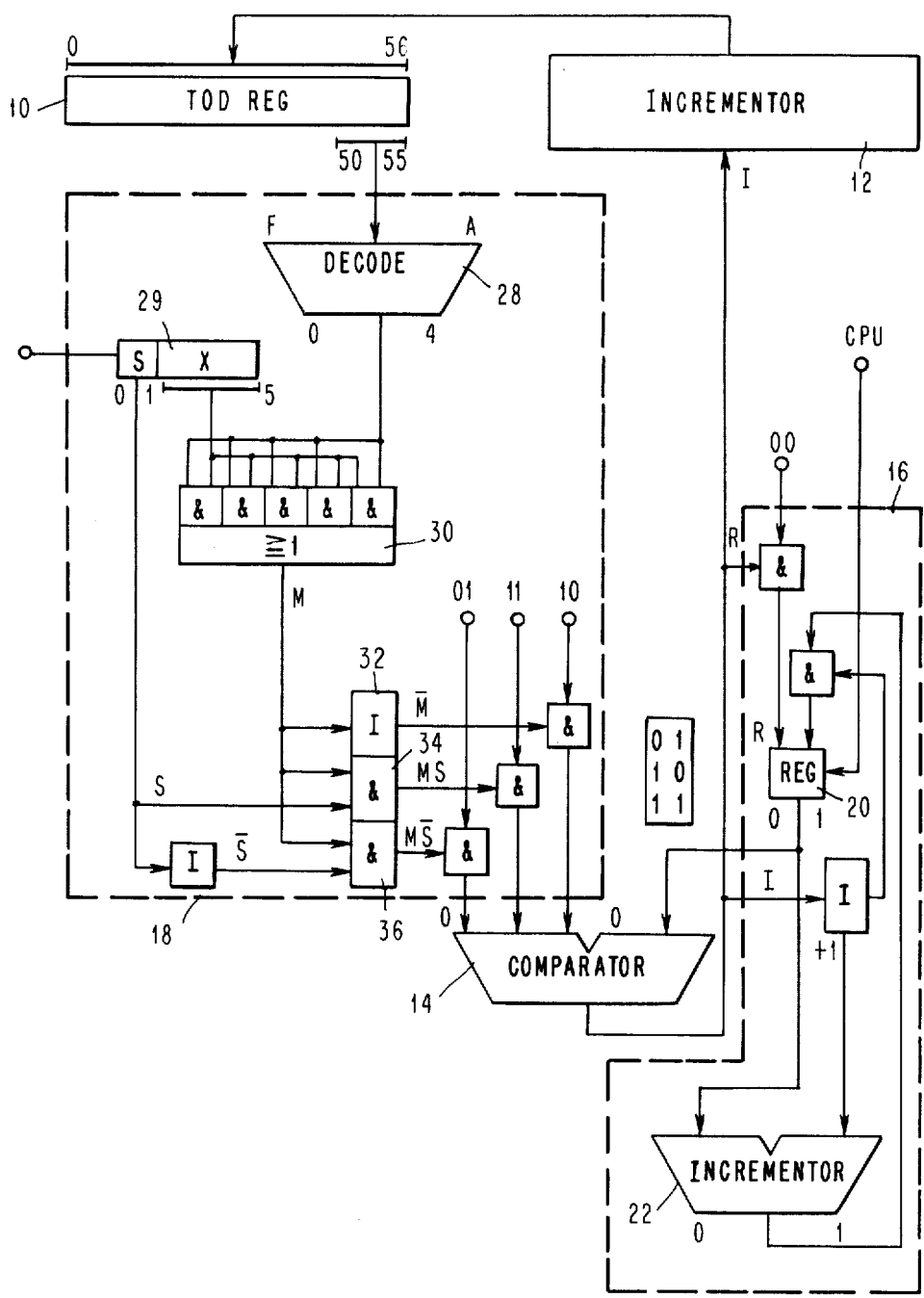

United States Patent [19]

Chang

[11] 4,349,890

[45] Sep. 14, 1982

[54] TIME OF DAY CLOCK CONTROL

[75] Inventor: David C. Chang, Pleasant Valley, N.Y.

[73] Assignee: International Business Machines Corp., Armonk, N.Y.

[21] Appl. No.: 107,811

[22] Filed: Dec. 28, 1979

[51] Int. Cl.³ .............................................. G06F 1/04
[52] U.S. Cl. .................................................. 364/900
[58] Field of Search ... 364/200 MS File, 900 MS File

[56] References Cited

U.S. PATENT DOCUMENTS 3,248,707  4/1966  Paul et al. ........................... 364/200
4,093,997  6/1978  Germer ............................... 364/900

OTHER PUBLICATIONS

*Regulation of Time of Day Clock*, Duke, IBM TDB, vol. 17, No. 7, Dec. 1974, pp. 2043-2045.

*Primary Examiner*—Harvey E. Springborn
*Attorney, Agent, or Firm*—James E. Murray

[57] ABSTRACT

A time of day clock for a computer is run off a clock for the computer processor by selecting the processor clock cycle T such that a binary multiple N of the time of day unit cycle D contains an integral number K of processor cycles T or ND=KT in accordance with the equation:

$$D=(R\pm X/N)T,$$

where R is the integer nearest the actual D/T ratio, while X represents the number of D cycles of longer or shorter duration than R processor cycles needed to establish the actual proportional relationship between the two cycles over the period ND.

3 Claims, 2 Drawing Figures

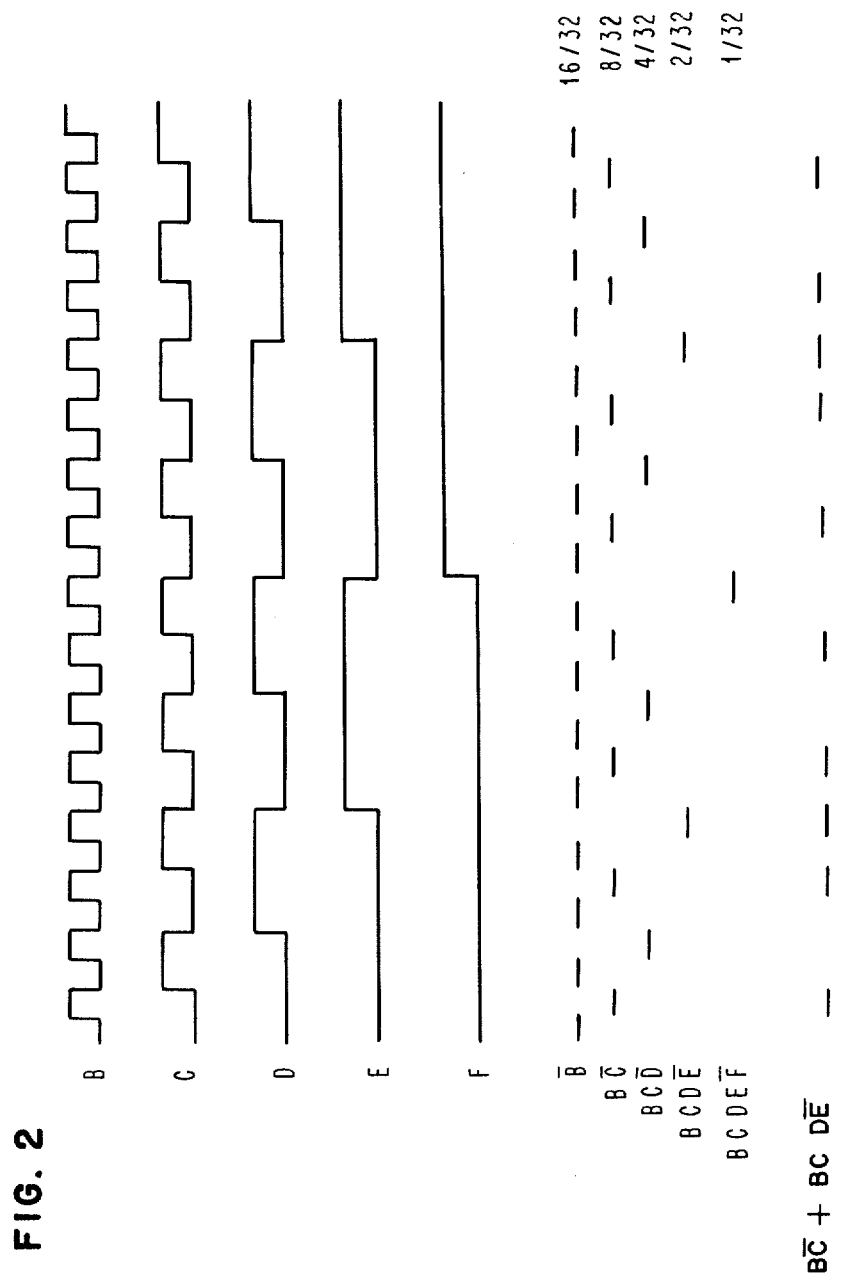

TIME OF DAY CLOCK CONTROL

BACKGROUND OF THE INVENTION

The present invention relates to the time of day clock for a computer. More particularly, it relates to generating the time of day clock for the computer from the same clock source for a processor in the computer.

The time of day (TOD) clock provides a consistent measure of elapsed time suitable for the indication of date and time. Usually, the time of day clock has a binary register with a number of bit positions that determines the elapsed time capacity and the resolution of the TOD clock. Time is measured by incrementing this register following rules for fixed point arithmetic. In the basic form, the register is incremented by adding one to a particular bit position every fixed period of time. For instance, say that you had a 51 position counter with an elapsed time capacity of 143 years the 51st position would be incremented once every microsecond. In models of the same elapsed time capacity but with higher or lower resolution, a lower or higher order bit position is incremented so that the rate of advancement of the clock is the same as if a 1 was added to position 51 every microsecond.

It has been suggested in an article entitled "Regulation of the Time of Day Clock" that appeared in the December 1974 issue of the IBM Technical Disclosure Bulletin, beginning on page 2043, that the time of day clock be run in synchronism with a clock for the processor by incrementing the time of day clock by a fixed amount every cycle of the processor clock. Typically, the fixed amount is not a whole number or integer so that it had to be synthesized. For instance, if the TOD clock is required to count to 4096 every microsecond using a 25 ns processor clock, 102.4 must be added to the count of the TOD clock in each cycle of the system clock. This can be achieved by adding 103 to the count of the TOD clock for every 4 out of 10 cycles of the processor clock and 102 to the count for the remainder of the 10 cycles. Because the system clock is imprecise, it is checked against a standard clock and the ratio of high to low counts is changed to keep the TOD clock within its precision standard. For instance, for a reduction of 0.120 in the 25 ns processor clock, the time of day counts must be incremented by 103 for 0.5 out of every 10 cycles.

THE INVENTION

In accordance with the present invention, a very flexible scheme is provided for operating the time of day clock off the same pulse source as the processor clock without reference to a time standard for checking the pulse source. This scheme involves relating processor clock cycle T by an integral number to a low binary multiple N of the time of day unit duty cycle D or in other words KT=ND in accordance with the following equation:

$$D = (R \pm X/N)T \quad (1)$$

where R is the integer nearest the actual D/T ratio and the integer X is the number of D cycles of longer or shorter duration than R processor cycles which must be added or subtracted from R to satisfy the actual proportional relationship over the period ND.

Therefore, it is one object of the present invention to provide a new clocking scheme for two clocks.

It is another object of the invention to run the time of day clock from the same clocking source as the processor clock while maintaining the accuracy of the TOD count.

It is a further object of the invention to provide a system of interconnected clocks which is practical, efficient, inexpensive and accurate.

THE DRAWINGS

This and other objects of the invention can be better understood from the following detailed description of the preferred embodiment of the invention as illustrated in the accompanying drawings, of which:

FIG. 1 is a schematic diagram of apparatus for synchronizing the TOD clock with another clock in accordance with the present invention and FIG. 2 is a pulse scheme for selecting the number of pulses for incrementing the TOD clock in accordance with the present invention.

DETAILED EMBODIMENT

Let us assume that the time of day clock has a capacity of 143 years and the required precision (0.005%) of the time of day clock dictates that the time of day register be 55 stages and thus be stepped every 62.5 ns. Furthermore, let us assume the computer processor unit (CPU) cycle time objective is 22 ns±0.5 (and its accuracy $\Delta T/T$ is technology limited to the order of say 0.5%). As pointed out previously, the plan is to effect synchronism between the two clocks by constraining the CPU cycle such that a certain large binary multiple, N, of the TOD unit cycle D, contains an integral number of CPU cycles, T or ND=KT. To meet the constraints set forth above, the present invention varies the length of certain of the time of day unit cycles as set forth in equation (1).

The following expressions follow from that equation (1):

$$\text{Cycle Time: } T = \frac{ND}{RN + X} \quad (2)$$

$$\text{Resolution: } \left(\frac{\Delta T}{T}\right) = \frac{T}{ND} \quad (3)$$

$$\text{Modified Cycles: } X = N\left(\frac{D}{T} - R\right) \quad (4)$$

Applying these equation to the assumed constraints R can be calculated.

$$\frac{D}{T} = \frac{62.5}{22} = 2.84$$

$$R = \text{Round of } 2.84 = 3.$$

For 0.5% accuracy, N will be:

$$.005 = \frac{1}{RN}, N = 66.6 \longrightarrow 64 \text{ (Binary)}$$

Now X can be calculated:

$$X = \left(N\left(\frac{D}{T} - R\right)\right) = 64(2.84 - 3) = -10.24 \longrightarrow -10.$$

The above says that the minimum segment satisfying the integral relationship is 64 TOD units, 10 of which are of modified size, containing 2 CPU cycles, the remainder are full size which is 3 CPU cycles.

The actual CPU cycle will be:

$$T = (64 \times 62.5)/(3 \times 64 - 10) = 21.978 \; NS.$$

The objective now is to generate a control which will step the time of day counter once every three cycles of the processor clock CPU for 54 of 64 cycles of the TOD clock and once every two cycles of the processor clock CPU for the remaining 10 of the 64 cycles of the TOD clock. The apparatus shown in FIG. 1 which includes numbered items of an applicable computing system, will not only do that, it will also generate various other combinations of long and short cycles to step the time of day counter. As shown, the register 10 of the time of day counter is driven by the incrementer 12 of the time of day counter. The incrementer steps the register through its various positions in accordance with binary fixed point mathematics when triggered by a pulse from a comparator 14 every time the count of a two bit binary counter 16 stepped by the CPU clock matches the output of a calculator 18. For instance, if the output of the calculator 18 is a binary 10 when the count in the counter reaches 10, the comparator provides a compare signal to the incrementer 12 which then adds a binary 1 to the count stored in the TOD register 10.

A register 20 in the counter 16 is incremented one position by incrementer 22 of each time there is a pulse from the CPU clock CPU until there is a compare signal from comparator 14. The compare signal R results in resetting the register 20 to zero on the occurrence of the next pulse from the CPU clock. Therefore, so long as the output of the calculator is 10 a binary 1 will be added to the total of the register 10 every three pulses of the CPU clock. However, the output of the calculator 18 changes with the count in places 50 to 55 of the time of day register 10 to provide the combination of long and short cycles mentioned previously.

The digits 50 through 55 of register 10 are fed into a decoder 28. The output lines 1 to 5 of the decoder 28 each carry one logic function of two or more of the digits 50 through 55. Each of the output lines is gated by one of the digits 1 through 5 of register 29 in a 5 way AND/OR gate 30. So long as any output line 0 to 4 of the decoder 28 does not match with any binary 1 digit placed in a corresponding locations 1 through 5 of the register 29, the output of the gate 30 issues a non-match signal $\overline{M}$ thru inverter 32 to gate a binary 10 signal into the comparator 10. Whenever any output of the decoder 28 matches a corresponding digit 1 through 4 in the register 29, the gate 30 issues a match signal M and either AND gate 34 or 36 is activated. Whether AND gate 34 or 36 is activated will depend on the number placed in the 0 position of the register 29. If the number is a 1, AND gate 34 is activated gating the binary number 1 into comparator. If the number is 0, gate 36 is activated gating the binary number 01 into the comparator.

In line with the previous calculations, the binary number 10 is to be selected on 54 of the 64 possible counts of the digits 50 to 55 and the binary number 01 selected in the remaining 10 counts. This is accomplished by placing the binary number 1010 in digits 1 to 5 of the register 29 and placing a binary 0 in position 0 of register 29. As shall be seen hereafter decoder 28 is functioned so that a binary 1 occurs in either position 1 or position 3 of its output 10 of the possible 64 counts of locations 50 through 55 of the register 10 and are both binary 0 for all other possible counts of positions 50 to 54.

In FIG. 2 curves B to F are the duty cycles for the positions 54 to 50 in ascending order. The duty cycles of various combinations of B to F are also shown along with a function indicating how many times they occur in the possible 32 combinations of B to F. Finally, the duty cycle of the logic function $B\overline{C} + BCD\overline{E}$ is shown to occur 10 times in the 32 counts. Thus, the function $M = A(B\overline{C} + BCD\overline{E})$ occurs 10 times in the 64 possible counts.

| Duty Cycle (per 64) | Function | x = 10 | Dec. output Pos. |
|---|---|---|---|
| 16 | A . $\overline{B}$ | 0 | 0 |
| 8 | A . $B\overline{C}$ | 1 | 1 |
| 4 | A . $BC\overline{D}$ | 0 | 2 |
| 2 | A . $BCD\overline{E}$ | 1 | 3 |
| 1 | A . $BCDE\overline{F}$ | 0 | 4 |

This function M can be used directly to select between the 10 and 01 inputs. When the function M comes up, 01 is selected; otherwise, 10 is selected. In the embodiment of FIG. 1 the decoder 28 generates each of the binary functions listed in the following table and places one of them on each of the output positions 1 to 4 as indicated. These output are fed into the AND gate 30 to be selected by the value placed in register 29 as described previously.

Having thus described our invention, what we claim as new, and desire to secure by Letters Patent is:

1. In a computer system having a time of day clock which is synchronized with a system clock by stepping the time of day clock at two different rates to synthesize fractional relationships between the periods of the time of day clock and the system clock the method comprising:

using a single oscillating source for both the time of day clock and the system clock, and selecting the system clock cycle T such that a binary multiple N of the time of day clock cycle D contains an integral number, K, of processor cycles, T, or ND=KT in accordance with the equation:

$$D = (R \pm X/N)T,$$

where R is the integer nearest the actual D/T ratio and X represents the number of time of day clock cycles D of longer or shorter duration than R processor cycles needed to establish the fractional relationship between the two cycles over the period ND.

2. The computer system of claim 1 including selecting the binary multiple N as a function of the processor cycle time T accuracy ΔT/T in accordance with the following formual:

$$\left(\frac{\Delta T}{T}\right) = \frac{T}{ND}$$

3. In a computer system having a time of day clock register run off a system clock by stepping the time of day clock register at two different rates to synthesize fractional relationship between the time of day clock period D and the system clock period T, the improvement comprising:

counting means for counting the number of pulses produced by the system clock, binary comparator means for resetting said counter to 0 and incrementing the time of day register when it produces a compare signal, logic circuit means responsive to binary counts in a number of stages of the register for feeding one binary number into said comparator on certain binary counts and another binary number into the register on other binary counts, and circuit means for periodically feeding the contents of said counting means into said comparator for comparison with one of said binary numbers to produce said compare signal when said contents is equal to the one of said binary numbers, whereby the time of day register is incremented at one rate when said one binary number is fed into said comparator and another rate when said other binary number is fed into said comparator.

* * * * *